United States Patent [19]

Estevez, Jr

[11] Patent Number: 5,287,579
[45] Date of Patent: Feb. 22, 1994

[54] LOADING AND BRIDGE RAMP FOR PICK-UP TRUCKS

[76] Inventor: Orestes Estevez, Jr, 13320 S.W. 79th St., Miami, Fla. 33183

[21] Appl. No.: 953,159

[22] Filed: Sep. 29, 1992

[51] Int. Cl.⁵ .............................................. B65G 69/28
[52] U.S. Cl. ........................................ 14/71.1; 296/61; 414/537
[58] Field of Search .................... 14/69.5, 71.1; 160/229.1, 233, 234; 414/537, 538; 296/61, 51, 55, 57.1; 16/223, 374, 389

[56] References Cited

U.S. PATENT DOCUMENTS

| | | | |
|---|---|---|---|
| 2,797,960 | 7/1957 | Endres et al. | 414/537 X |
| 3,339,968 | 9/1967 | Hall | 296/61 |
| 3,352,440 | 11/1967 | Wilson | 414/537 |
| 3,713,553 | 1/1973 | Curtis et al. | 296/61 X |
| 4,127,201 | 11/1978 | Baumann . | |
| 4,247,028 | 1/1981 | Maitani et al. | 16/223 X |
| 4,443,905 | 4/1984 | Knopp . | |
| 4,864,672 | 9/1989 | Altieri et al. . | |
| 4,913,615 | 4/1990 | Ward | 414/537 |
| 4,944,546 | 7/1990 | Keller | 414/537 X |
| 5,195,205 | 3/1993 | Cook | 14/71.1 |

FOREIGN PATENT DOCUMENTS 2028014 4/1992 Canada .................................. 14/69.5

*Primary Examiner*—Ramon S. Britts
*Assistant Examiner*—James A. Lisehora
*Attorney, Agent, or Firm*—J. Sanchelima

[57] ABSTRACT

A ramp for loading a pick-up truck that is collapsable so that it can be transported and stored in a minimum space. The ramp is removably mounted to the rear tail gate of a pick up truck. The ramp includes three contiguously hingedly connected rectangular flat members that open or distend with their planes at predetermined angles with respect to each other. This is accomplished by sharing the load placed on said flat members between the shear on the hinge assemblies and the angled abutting edges compression load. The shaft of one of the hinge assemblies extends and a handle member is mounted thereon for prompt manipulation of the ramp.

2 Claims, 3 Drawing Sheets

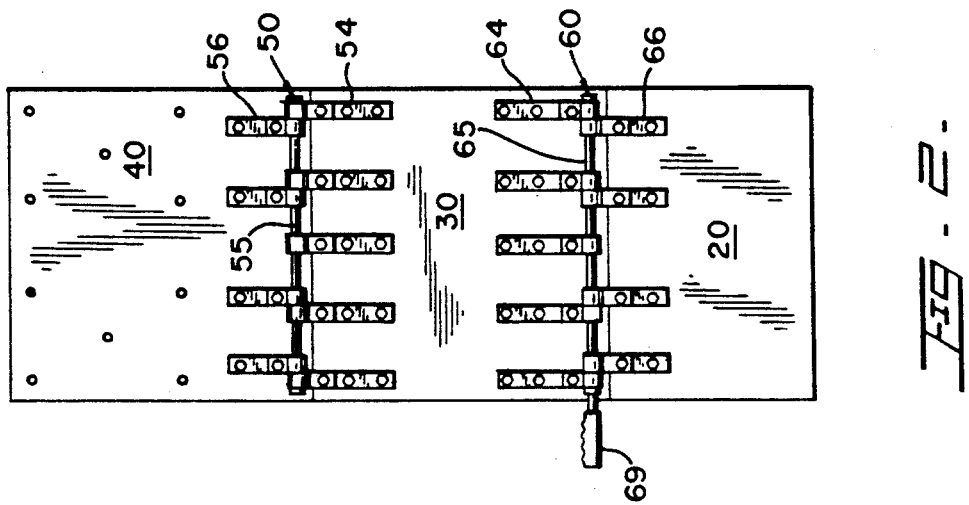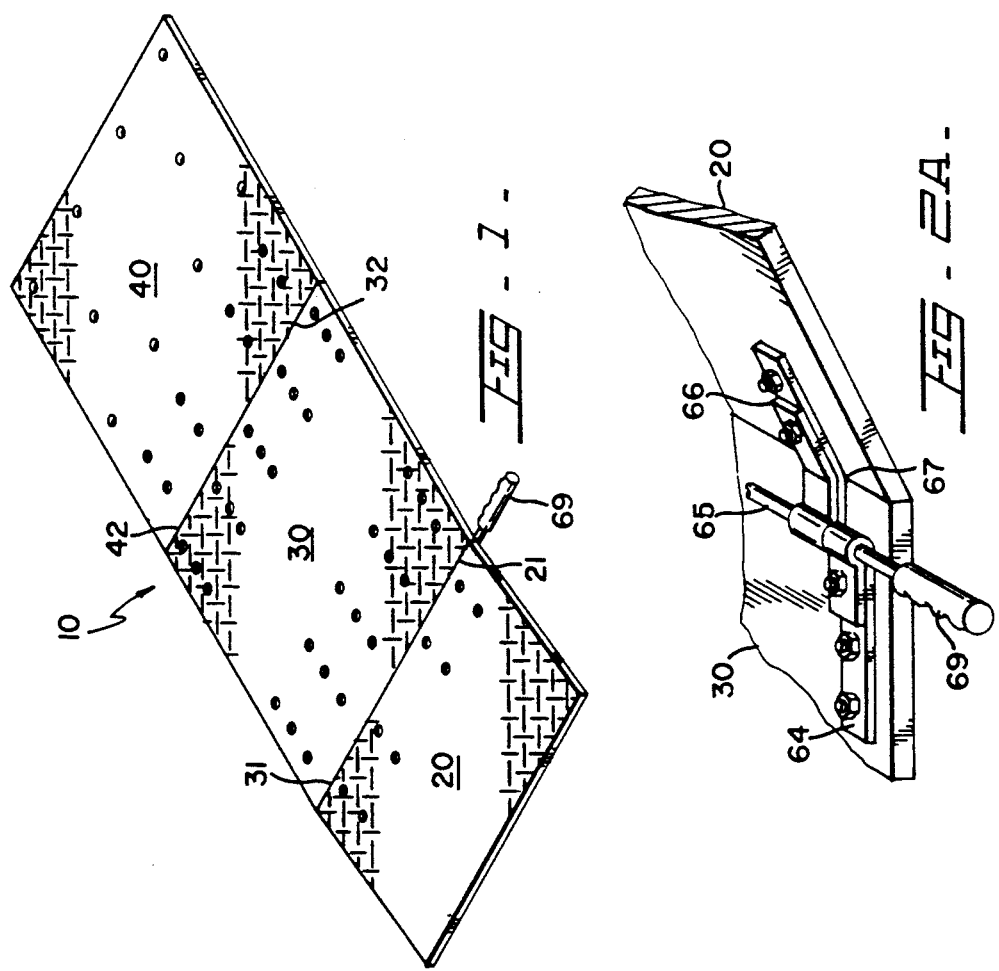

LOADING AND BRIDGE RAMP FOR PICK-UP TRUCKS

BACKGROUND OF THE INVENTION

1. Field of the Invention

The present invention relates to bridge ramps, and more particularly, to those bridge ramps that can be readily removed from the back door of trucks.

2. Description of the Related Art

Applicant believes that the closest reference corresponds to U.S. Pat. No. 4,864,672 issued to Altieri et al., U.S, Pat. No. 4 127,201 issued to Baumann, and U.S. Pat. No. 4,443,905 issued to Kopp. However, it differs from the present invention because Altieri cannot readily be used as a loading ramp from the ground floor like the one disclosed in Baumann, and visa versa. The hinge approach disclosed in Kopp also fails to provide for a ramp that can be used for both applications. More important, the novel hinge features of the present invention are not suggested in these references taken either singly, or in combination.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a loading ramp that can also be used as a bridge ramp from the tail gate of a truck to the dock.

It is another object of this present invention to provide a ramp that can be readily collapsed and stored with volumetric efficiency.

It is still another object of this present invention to provide such a ramp that is light and yet sturdy enough to support substantial weight.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the ramp subject of the present invention.

FIG. 2 shows a bottom view of the present invention.

FIG. 2A is a detail representation of a portion of the hinge assembly, as seen from the bottom.

DETAILED DESCRIPTION OF THE PREFERRED EMBODIMENT

Figure 3:
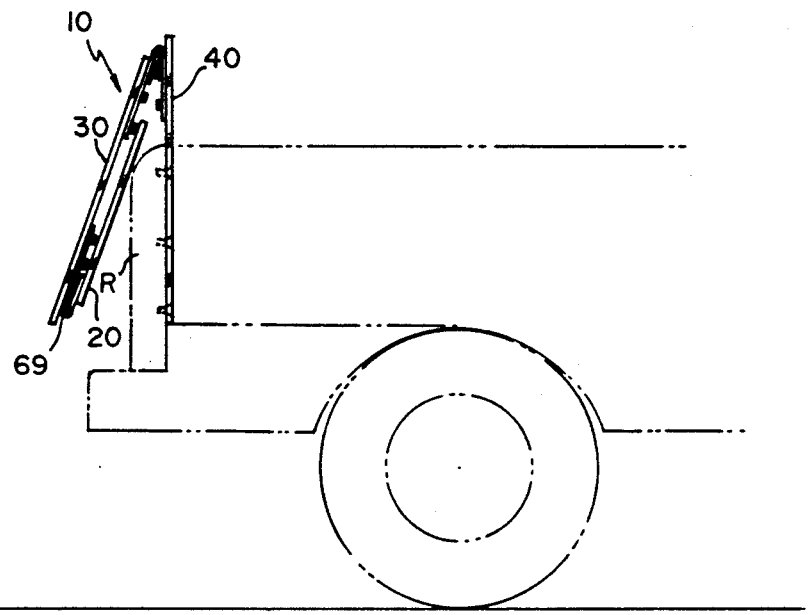
FIG. 3 illustrates a side view of the collapsed ramp represented in the previous figures as it is stored or transported.

Referring now to the drawings, where the present invention is generally referred to with numeral 10, it can be observed that it basically includes flat members 20; 30 and 40 contiguously and hingedly mounted to each other, as best seen in FIGS. 1 and 2. These flat members are preferably made out of aluminum in order to keep the weight down and to with stand the elements.

As can be seen from FIG. 2, hinge assemblies 50 and 60 keep flat members 20; 30 and 40 together. Central flat member 30 shares both hinge assemblies with outer flat members 20 and 40. It should be noted that pin members 55 and 65 are offset with respect to the edges of the abutting flat members, or in other words, are not positioned between the flat members. Hinge leaves 56 and 64 are mounted on flat members 40 and 30, respectively. Hinge leaves 54 and 66, on the other hand, are over the abutting edges of flat members 40 and 30, and the abutting edges of flat members 30 and 20, respectively. This permits hinge leaves 54 and 66 to double as stoppers so that the planes of flat members 20; 30 and 40 are aligned at a certain predetermined angle with respect to each other. Hinge leaf 66 includes a bend 67 that cooperates with the angled termination of edges 21 and 31. In addition to the stopper action of hinge leaves 54 and 66, abutting edges 21; 31; 32 and 42 come in contact with each other thereby also acting as stoppers at predetermined angles. In the preferred embodiment edges 32 and 42 are perpendicular to the planes of flat members 30 and 40 thereby the latter defining a plane. These abutting edges have an angled termination for cooperatively causing the hinged flat members to up to a maximum predetermined angle. In this matter, the load is shared between the shear on hinge leaves 54 and 66 and the longitudinal compression stress along members 20; 30 and 40. A handle member 69 is mounted to one protruding end of shaft 65 so that the handling of ramp 10 is facilitated.

Figure 4:
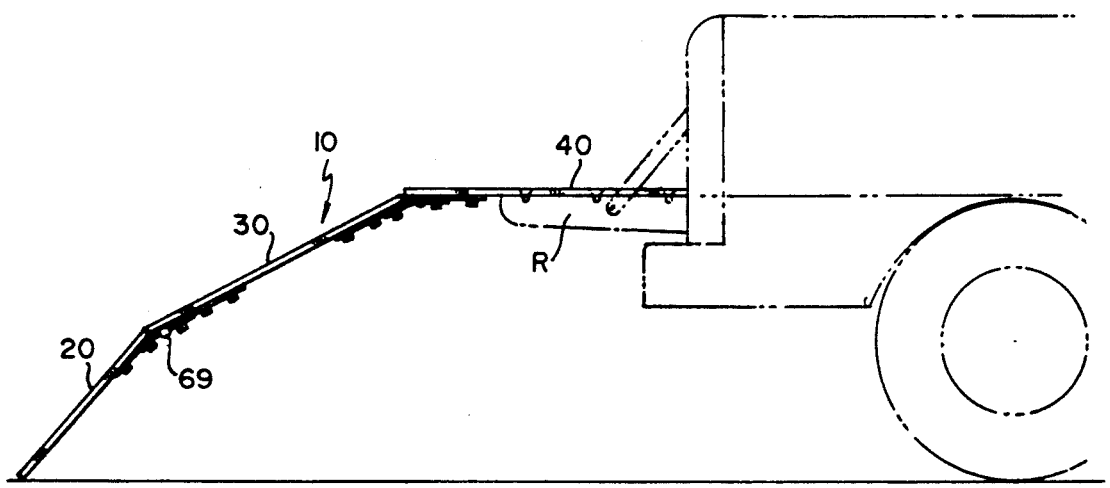
FIG. 4 is a representation of the ramp shown in the previous figures in the distended configuration and ready to be used as a loading ramp from the ground level.
Figure 5:
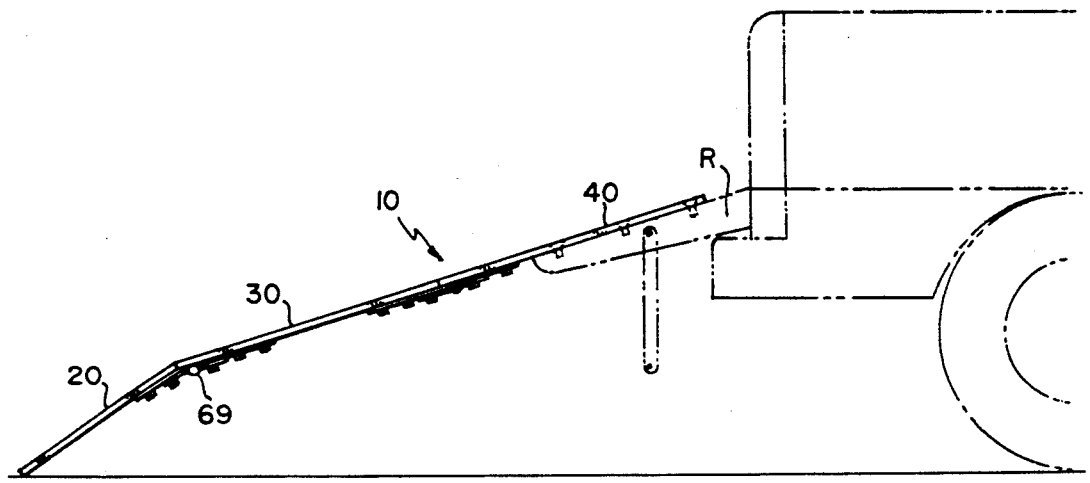
FIG. 5 is a variation of the distended configuration shown in FIG. 4 used where the space permits.
Figure 6:
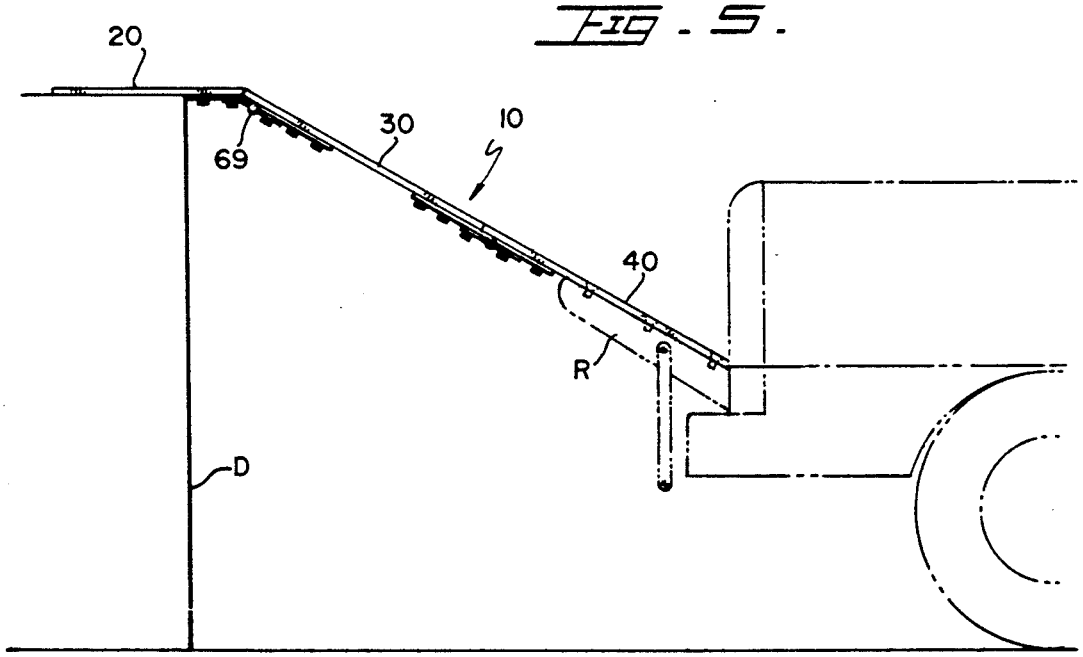
FIG. 6 shows the ramp in the bridge application mounted to a dock.

As seen in FIG. 3, ramp 10 in the preferred embodiment is collapsed and removably mounted to tail gate R typical of pick up trucks. When extended it permits the loading of cargo to a pick up truck as shown in FIGS. 4; 5 and 6. Flat members 20; 30 and 40, when distended, are aligned at certain predetermined angles that permit a user to load and unload a pick up truck from the ground or from a platform dock D.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A loading and bridging ramp removably mounted to the rear tail gate of pick-up trucks, comprising:
    A. first, second and third rectangular flat members contiguously disposed and said flat members further including four edges each and wherein said second flat member is centrally disposed with respect to said first and third flat members so that said first and third flat members have each one abutting edge with said second flat member;

B. first hinge means for hingedly connecting said first and second flat members said first hinge means further includes a first shaft member and at least two first hinge leaf members and said first hinge means being mounted so that said first shaft member is parallel to and offset from the abutting edges of said first and second flat members wherein one of said first hinge leaf members is partially on said first and second flat members and further includes a bend substantially coinciding with the abutting edges of said first and second flat members so that said first and second flat members can open up to a predetermined angle;

C. second hinge means for hingedly connecting said second and third flat members said second hinge means further includes a second shaft member and at least two second hinge leaf members and said second hinge means being mounted so that said second shaft member is parallel to and offset from the abutting edges of said second and third flat members wherein one of said second hinge leaf members is partially on said first and second flat members and further includes a bend substantially coinciding with the abutting edges of said second and third flat members so that said first and second flat members can open up to a predetermined angle wherein said abutting edges include cooperative angled terminations that cause said contiguously hinged flat members to open up to said predetermined angle; and D. means for removably mounting said first flat member to said rear tail gate.

2. The ramp set forth in claim 1 wherein said first hinge shaft includes an end that protrudes beyond said edges and further including handle means mounted to said protruding end.

* * * * *